Sept. 12, 1967      R. M. BLASEN      3,341,034

CARGO HANDLING MACHINE

Filed July 2, 1965      6 Sheets-Sheet 2

INVENTOR.
RICHARD M. BLASEN

BY *Kimmel, Crowell & Weaver*

ATTORNEYS.

Sept. 12, 1967    R. M. BLASEN    3,341,034
CARGO HANDLING MACHINE
Filed July 2, 1965    6 Sheets-Sheet 4

INVENTOR
RICHARD M. BLASEN
BY *Kimmel, Crowell & Weaver*
ATTORNEYS.

Sept. 12, 1967 R. M. BLASEN 3,341,034
CARGO HANDLING MACHINE
Filed July 2, 1965 6 Sheets-Sheet 5

INVENTOR.
RICHARD M. BLASEN
BY Kimmel, Crowell & Weaver
ATTORNEYS.

Sept. 12, 1967   R. M. BLASEN   3,341,034
CARGO HANDLING MACHINE
Filed July 2, 1965   6 Sheets-Sheet 6

INVENTOR.
RICHARD M. BLASEN
BY Kimmel, Crowell & Weaver
ATTORNEYS.

2

United States Patent Office 3,341,034
Patented Sept. 12, 1967

3,341,034
CARGO HANDLING MACHINE
Richard M. Blasen, Lake Oswego, Oreg.
(P.O. Box 3288, Honolulu, Hawaii 96801)
Filed July 2, 1965, Ser. No. 469,273
12 Claims. (Cl. 214—14)

ABSTRACT OF THE DISCLOSURE

A cargo handling device having a cargo receiving surface and an entry thereto for lift trucks, an elevator suspended from an extended support frame for movement from a vessel hold to a position adjacent the cargo receiving area, an entry into the cargo receiving area from the elevator, cooperating conveyors on the elevator and in the cargo receiving area for transferring palletized cargo articles therebetween and a control system for the elevator and the conveyors is disclosed.

This invention relates to a cargo handling apparatus, and particularly to a device for loading and unloading palletized or containerized cargo from between a dock and a water-going vessel.

At the present time, water-going vessels are usually loaded and unloaded by the use of cranes which may use large nets or grapples to remove cargo from the hold to the dock or to lift cargo from the dock to the hold of a nearby vessel.

The existing loading procedure may be segregated to three major states: the assembly and preparation of the articles on the dock; the lifting, pivoting and lowering operations performed by a crane and the disassembly of the crane carried load and movement thereof after placement in the hold of a vessel. Each of these stages requires numerous workmen and expensive equipment, such as fork lifts, fork lift operators, a large expensive crane, crane operators, bales, grappling devices, nets and the like.

Many vessels, particularly older ones and some barges, are equipped with small hatches, thus precluding the delivery of extra large loads at any particular time. In such circumstances, the use of cranes is extremely expensive since many trips must be made between the ship or barge and the dock. Existing unloading procedures and apparatus are substantially identical, although reversed, and likewise suffer from many disadvantages, some of which have been previously intimated.

It is a primary object of the instant invention to provide a cargo handling device which is peculiarly adapted to load and unload palletized or containerized cargo.

It is another object of the instant invention to provide a mobile cargo handling machine which includes a vertically reciprocable elevator.

A still further object of the instant invention is to provide a mobile cargo handling machine which may be positioned at the end of a dock and which is provided with a vertically reciprocable elevator means which may descend onto an adjacent vessel or into an open hatch thereof.

Another object of this invention is to provide a cargo handling machine which may be utilized in conjunction with a conventional fork lift so that the fork lift may engage a palletized or containerized load and position it on the cargo handling device which will lower the load by an elevator means of the instant invention into the open hatch of an adjacent vessel, and which may be unloaded from the elevator means by a second fork lift.

A further object of this invention is to provide a cargo handling device having an elevator means which may be actuated from a remote station.

Another object of the instant invention is to provide a cargo handling device having a reciprocable elevator which may be used in conjunction with a fork lift such that the fork lift operator may actuate the elevator from the fork lift operator's position.

Still another object of the instant invention is to provide a cargo handling device having a cargo exchanging area and an elevator which is automatically positioned substantially co-planar with the cargo exchanging area for facilitating the loading and unloading of an adjacent vessel.

A further object of this invention is to provide a vertically reciprocable elevator means having a conveyor for moving a palletized or containerized load onto or off said elevator means.

A still further object is to provide an elevator means having a conveyor with a power take off arrangement such that the conveyor may be actuated only when the elevator is in an appropriate cargo exchanging area.

Still another object of this invention is to provide a plurality of cargo loading and unloading conveyors which are actuated by a load moving over the conveyors.

Other objects and advantages of the instant invention reside in the combinations of elements, arrangements of parts, and features of construction and operation, all of which will be more fully pointed out hereinafter and disclosed in the accompanying drawings wherein there are shown preferred embodiments of this inventive concept.

Referring now to the drawings in detail, wherein like reference characters designate like elements throughout the several views thereof, and particularly to FIGURES 1 to 9 inclusive, there is indicated generally at 10 a cargo handling device of the instant invention comprising a frame means indicated generally at 12, an elevator means shown generally at 14 and movable ground supporting means indicated generally at 16 supporting frame means 12 on a dock surface 18.

Frame means 12 includes a first lower supporting member 20 providing a cargo exchanging surface 22 having an initial edge 24 and a terminal edge 26 across which cargo is loaded and unloaded. Positioned along cargo receiving surface 22 is a first conveyor shown generally at 28 and a second conveyor shown generally at 30 for moving palletized or containerized cargo across cargo exchanging surface 22.

First conveyor 28 includes a shaft 32 rotatably mounted by bearings 34 and carrying a series of idler sprockets 36. First conveyor 28 also includes a second shaft 38 rotatably mounted in bearings 40 and carrying a series of keyed sprockets 42. A series of chains or belts 44 are wound about sprockets 36, 42 in a conventional manner.

Second conveyor 30 includes shaft 38 and a series of idler sprockets 46 as well as a third shaft 48 rotatably mounted in bearings 50 and carrying a series of keyed sprockets 52. Looped about sprockets 46, 52 in a conventional manner are conveyor chains or belts 54.

Figure 3:
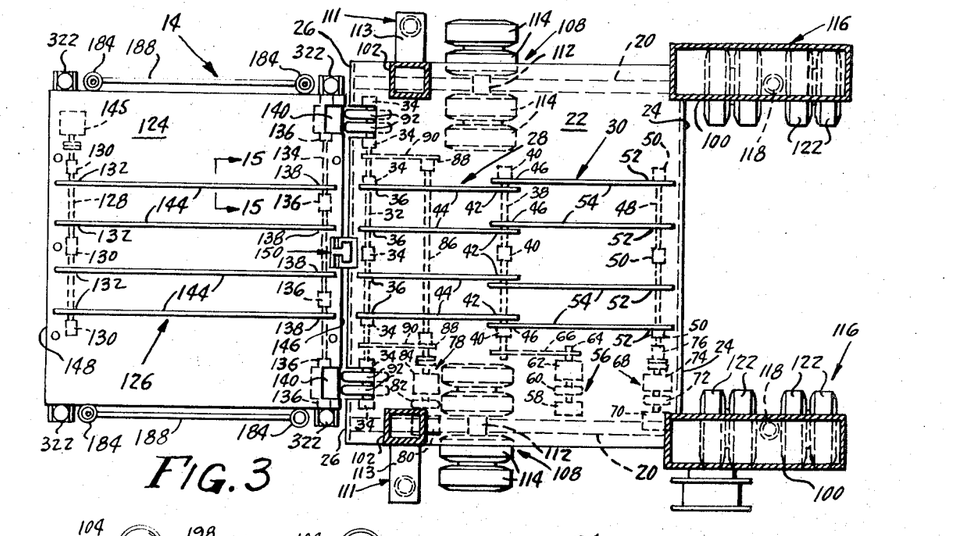
FIGURE 3 is a plan view, partially in section, of the working surfaces of one form of cargo handling device of the instant invention.
Figure 4:
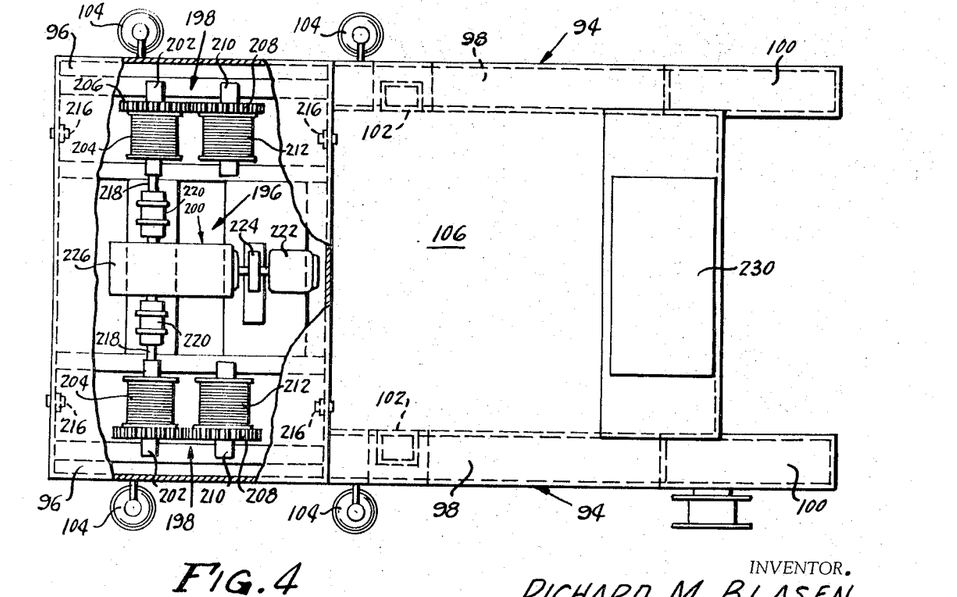
FIGURE 4 is a top plan view of the cargo handling device of FIGURE 1, certain parts being broken away for purposes of illustration.

Driving first conveyor 28 is a first motor and transmission means indicated generally at 56 comprising a motor 58, which may be of either the hydraulic or electric type, a clutch means 60, and a transmission or drive reducer 62 having an output shaft 64. Output shaft 64 is drivingly connected with rotatable shaft 38 by a drive belt 66 as shown in FIGURE 3. It should be apparent that the input of energy into motor 58 results in the rotation of drive shaft 64 and consequently rotatable shaft 38. Since sprockets 42 are keyed to shaft 38, first conveyor 28 will rotate in the direction of the rotation of motor 58. Since sprockets 46 are idler sprockets, no rotation of second conveyor 30 will result.

Driving second conveyor 30 is a second drive and transmission means indicated generally at 68 including a motor 70, a clutch means 72, a transmission or drive reducer 74 drivingly coupled to shaft 48 by a fixed connection 76. The input of energy to motor 70 results in the rotation of shaft 48 in a given direction, which results in the rotation of drive sprockets 52 in the same direction thus providing for the movement of first conveyor 30.

Since motors 58, 70 of first and second conveyors 28, 30 are reversible, palletized or containerized cargo may be moved in either direction along cargo exchanging surface 22. It is preferred that conveyor means or belts 44, 54 are substantially co-planar with surface 22 such that a fork lift truck or other vehicle may drive across surface 22 without undue damage to the conveyors.

For purposes more fully explained hereinafter, a drive means indicated generally at 78 is provided to drive shaft 32 and includes a motor 80, a clutch means 82, a drive reducer 84 fixedly coupled to a drive shaft 86 carrying sprockets 88. Drive chains 90 connect drive sprockets 88 to shaft 32. Fixedly mounted on shaft 32 are a plurality of spaced apart friction wheels 92 which extend beyond terminal edge 26 to drivingly engage a conveyor on platform means 14 as more fully explained hereinafter.

Frame means 12 includes a pair of parallel supporting members shown generally at 94 which form a bulbous section 96 extending beyond terminal edge 26 of lower supporting member 20, a pair of intermediate upper supporting members 98 and a pair of lower spaced apart sections 100 connecting intermediate section 98 to lower supporting section 20. A pair of additional supports 102 connect intermediate section 98 and lower support 20.

It should be apparent that frame means 12 provides a first area of ingress and egress adjacent the initial edge 24 of cargo exchanging surface 22 and a second area of ingress and egress adjacent terminal edge 26 of cargo exchanging surface 22. As more fully explained hereinafter, cargo is delivered through the first area of ingress and egress to cargo exchanging surface 22 and is conveyed by conveyors 28, 30 to the second area of ingress and egress onto elevator 14 which may then lower the cargo to an awaiting ship. To unload the ship the reverse process is used.

In order to make cargo handler 10 more utilitarian, a series of flood lights 104 are positioned on supporting member 94 to illuminate the working area during hours of darkness. For similar reasons, an upper shell 106 is provided to span parallel supporting members 94 to shield the loading areas from elements of the weather.

Traction supporting means 16 includes a first pair of aligned rubber wheeled assemblies 108 including a vertical post 110 fixedly mounted on frame 12 and carrying an axle 112 on which are rotatably mounted a plurality of conventional rubber wheels 114. Support means 16 also includes a pair of rear wheel assemblies shown generally at 116 including a housing 118 within which is rotatably mounted a vertical post 119 carrying a horizontal axle 120 on which is rotatably mounted a plurality of conventional rubber wheels 122. As may be seen by a comparison of FIGURES 1, 2 and 3, rear wheel assemblies 116 are provided with any suitable means such as a bevel gear to position wheels 120 to track wheel assemblies 108 during the movement of cargo handling machine 10 from one location to another. When cargo handling machine 10 is positioned at the end of a dock 18 adjacent a conventional bull rail 123 against which front wheels 114 may rest, rear wheel assemblies 116 are rotated to a position perpendicular to front wheel assemblies 108 to preclude the movement of cargo handling machine 10 on dock surface 18. This rotatable feature of rear wheel assemblies 116 also provides a substantially unimpeded entry to initial edge 24 of cargo exchanging surface 22 as seen in FIGURE 3.

Positioned on each lateral side of lower frame member 20 is an auxiliary load support shown generally at 111 including a lateral extending brace on support 113 to which is dependingly secured a vertically reciprocable load supporting means 115 which may be either a mechanical jack or hydraulic cylinder. The actuation of load supporting means 115 after wheels 114 have been placed against bull rail 123 and after wheel assemblies 116 have been rotated produces a structurally stable device allowing for the movement of cargo onto a barge 131 or the like.

Figures 10, 11, 12, 13, 14, 15:
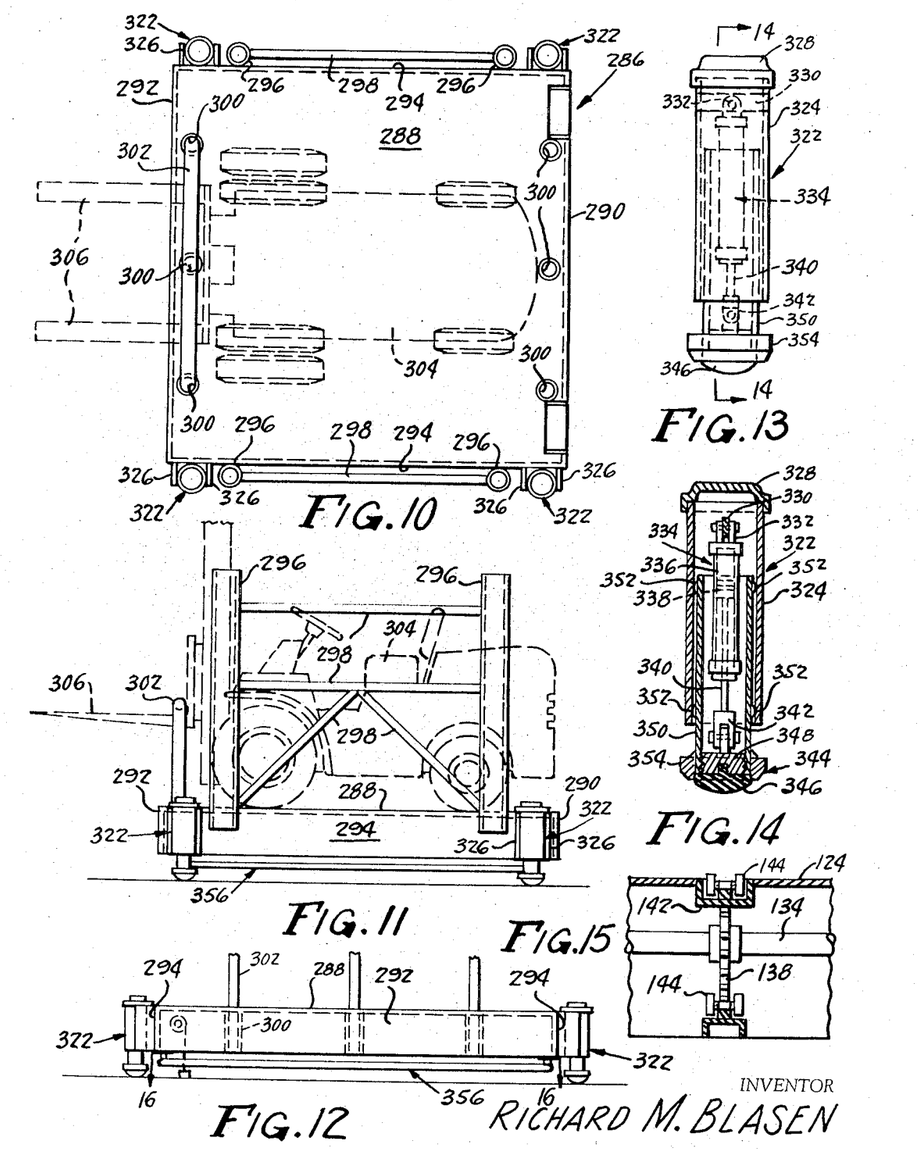
FIGURE 10 is a top plan view of the elevator platform which is partially shown in FIGURE 8, a fork lift truck being shown in dotted line position.
FIGURE 11 is a side elevational view of the fork lift truck and elevator means shown in FIGURE 10.
FIGURE 12 is a front elevational view of the elevator platform of FIGURES 10 and 11.
FIGURE 13 is a front elevational view of a snubber used in conjunction with the elevator means of FIGURES 10 to 12 inclusive.
FIGURE 14 is a longitudinal cross-sectional view of snubber of FIGURE 13.
FIGURE 15 is a partial cross-sectional view of the drive means and chain conveyor of the elevator means of FIGURES 10 to 12 inclusive, taken along line 15—15 of FIGURE 3 and viewing in the direction of the arrows.
Figure 16:
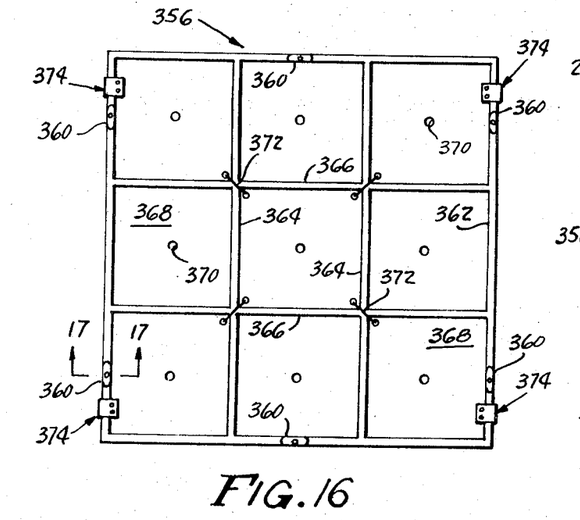
FIGURE 16 is a top plan view of the safety cut-off frame utilized in conjunction with the elevator means of FIGURES 10 to 12 inclusive as seen from line 16—16 of FIGURE 12.

Elevator means 14 includes a cargo supporting surface 124 which carries a third conveyor means shown generally at 126. Conveyor means 126 includes a first shaft 128 rotatably mounted in a series of bearings 130 and carrying a series of idler sprockets 132. Conveyor means 126 also includes a second shaft 134 rotatably mounted in bearings 136. Shaft 134 carries a series of keyed sprockets 138 intermediate its ends and a pair of frictional drive wheels 140 positioned adjacent the ends of shaft 134 in driving relation with frictional drive wheels 92 of frame means 12. As shown in FIGURE 15, cargo supporting surface 124 provides a series of recessed raceways 142 in which reside a series of conveyor chains or belts 144 which are looped about sprockets 132, 138 in a conventional manner. The juxtaposition of cargo supporting surface 124 and cargo exchanging surface 22 allows drive wheels 92 to rotate frictional wheels 140 to move conveyor 126 in the appropriate manner.

Figures 1, 2:
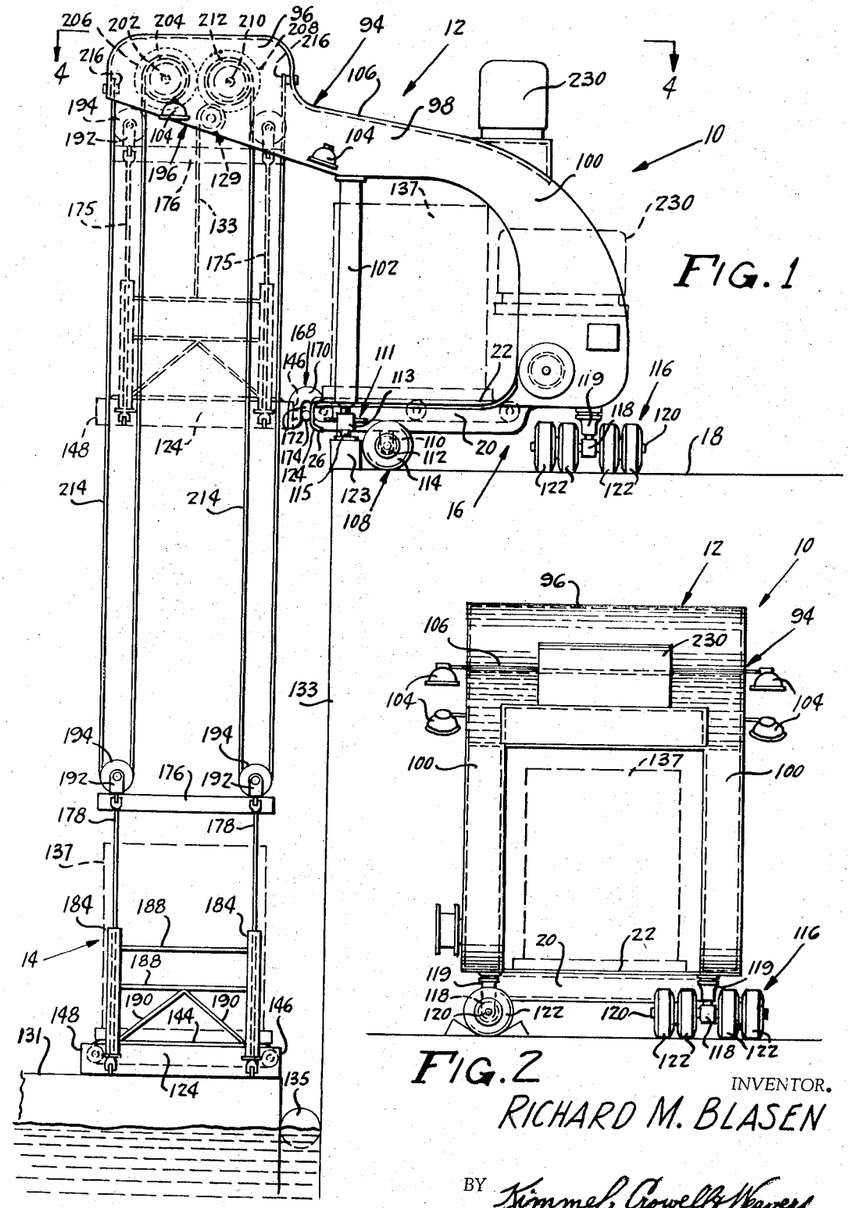
FIGURE 1 is a side elevational view of one form of the cargo handling device of the instant invention showing in dotted lines the movement of a containerized load from a dock area onto an adjacent vessel.
FIGURE 2 is a rear elevational view of the cargo handling device of FIGURE 1.

An alternate form of driving conveyor 126 is shown generally as 129 in FIGURE 1 and includes a reel 131 mounted in bulbous section 96 carrying a power cable 133 leading to elevator means 14 in electrical communication with an electric motor 135 in driving engagement with shaft 128. In this form of conveyor operating device it should be understood that sprockets 132 are keyed to shaft 128 with frictional drive wheels 140, 92 being omitted.

As shown in FIGURE 3, cargo supporting surface 124 of elevator means 14 is provided with an initial edge 146 positioned adjacent terminal edge 26 of cargo exchanging surface 22 and a terminal edge 148. A positioning device indicated generally at 150 is provided to insure that surfaces 22, 124 are aligned during loading and unloading and to insure that drive wheels 92 are pressed against friction wheels 104 so that conveyor 126 may be operated.

Figures 21, 22:
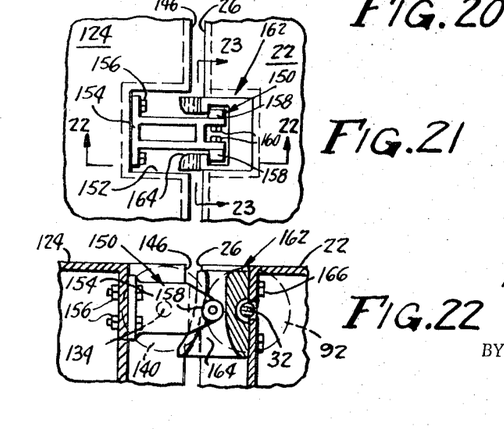
FIGURE 21 is a top plan view of a connection between the elevator platform and a cargo exchanging surface of the frame of the cargo handling device of the instant invention.
FIGURE 22 is a cross-sectional view of the connection of FIGURE 21 taken along line 22—22 thereof and viewing in the direction of the arrows.
Figure 23:
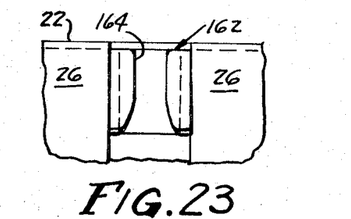
FIGURE 23 is a front elevational view of the connecting means on the cargo exchanging surface of the cargo handling device of the instant invention as seen from line 23—23 of FIGURE 21.

As shown in FIGURES 21 and 22, elevator platform 124 provides a central indentation 152 along initial edge 146 in which resides a lock roller shank 154 secured thereto by a plurality of conventional frictional fasteners 156. Secured on the outer end of shank 154 is a pair of rollers 158 rotatably mounted on shank 154 by any conventional fastener 160. Positioned in cargo exchanging surface 22 substantially flush with terminal edge 26 is a lock shoe shown generally at 162 forming a central slot 164 which, in front elevation as shown in FIGURE 23, is wider at its lower edge to facilitate the guiding of shank 154 therein. In longitudinal cross sectional elevation as shown in FIGURE 22, slot 164 is wider at its lower edge which also facilitates the insertion of rollers 158 therein. Lock shoe 162 is secured to terminal edge 26 by any suitable fastening means, such as metal screws 166. It should be apparent that when elevator platform 124 is raised approaching alignment with surface 22, rollers 158 enter slot 164 which guides platform 124 closely adjacent terminal edge 26 and effects the friction of engagement of drive wheels 92 with friction wheel 140.

Another form of positioning means is shown generally at 168 in FIGURE 1 and includes an arch-shaped support 170 forming an arcuate slot 172 in which resides a roller 174 secured to initial edge 146 of cargo supporting surface 124.

Figure 5:
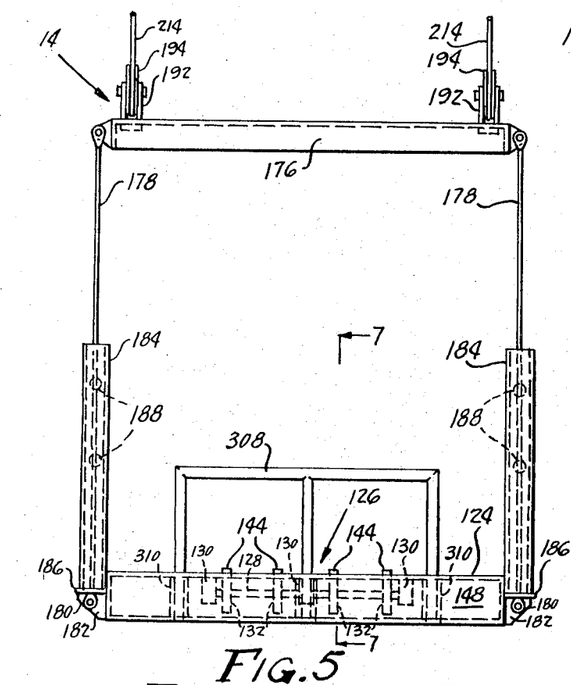
FIGURE 5 is a front elevational view of the elevator associated with the cargo handling device of FIGURE 1.
Figure 6:
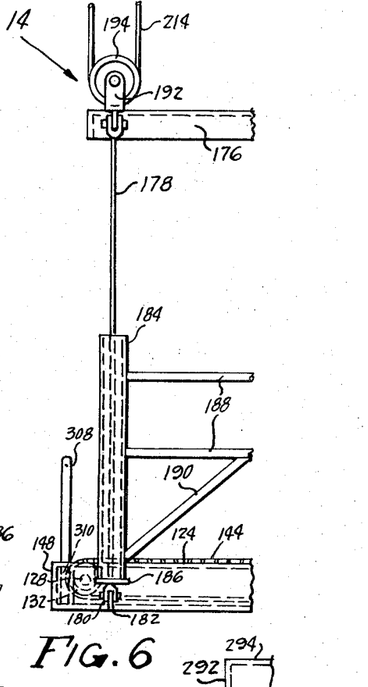
FIGURE 6 is a partial side elevational view of the elevator of FIGURE 5.
Figure 7:
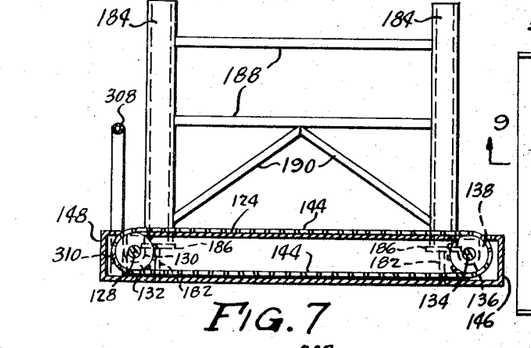
FIGURE 7 is a cross-sectional view of the elevator of FIGURE 5 along line 7—7 thereof and viewing in the direction of the arrows.
Figure 8:
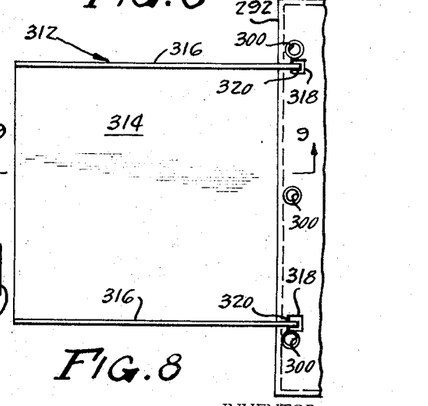
FIGURE 8 is a top plan view of a dock board affixed to another form of elevator platform, but which may be used in the elevator platform shown in FIGURES 5 to 7 inclusive, certain parts being broken away for clarity of illustration.
Figure 9:
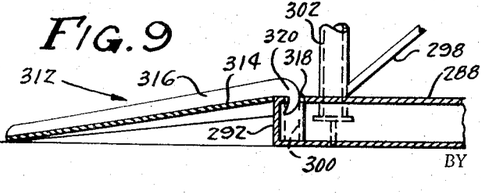
FIGURE 9 is a cross-sectional view of the dock board and elevator platform of FIGURE 8 taken along line 9—9 thereof and viewing in the direction of the arrows.

Elevator means 14 includes a sheave carriage 176, which may be of any desired configuration, but which is preferably a rectangular framed structural member, to which is secured a plurality of depending cables or other flexible members 178 which are in turn secured by a series of pins 180 and brackets 182 to elevator platform 124. Providing protection for cables 178, as shown in FIGURE 5, are a series of tubes 184 secured to brackets 182 by a transverse plate 186 surrounding cables 178 to protect them from abrasion or impact with a palletized or containerized load. Tubes 184 are made structurally rigid by a plurality of transverse conventional braces 188 and a series of diagonal braces 190.

Sheave carriage 176 carries a plurality of upwardly extending U-shaped members 192 which rotatably carry a series of rotatably mounted pulleys 194 in any suitable configuration. Mounted within bulbous section 96 of frame means 12 is a hoist means shown generally at 196, which may be of any conventional type, but which preferably includes two pair of spaced apart reel means shown generally at 198 in FIGURE 24 and a drive and transmission means shown generally at 200. Reels 198 include a first shaft 202 rotatably mounted in frame means 12 which carries a drum 204 and a gear ring 206. In driving connection with gear ring 206 is another gear ring 208 which is mounted on a rotatable shaft 210 carrying a second drum 212.

Four different hoist lines 214 are wound about drums 204, 212, are looped about pulleys 194 and are dead ended as at 216 in frame means 12 as shown in FIGURE 1. Cables 214 are wound on drums 204, 212 such that the rotation of drum 204 in a given direction will result in the simultaneous take up or pay out of cables 214.

Drivingly engaged with shafts 202 of drums 204 is a pair of drive shafts 218 suitably connected to a spacer coupling 220. Connecting drive shafts 218 to a motor 222 which may be of the hydraulic or electric variety, is a load break 224 and a drive reducer or transmission 226 of known types.

Figures 24, 25, 26, 27:
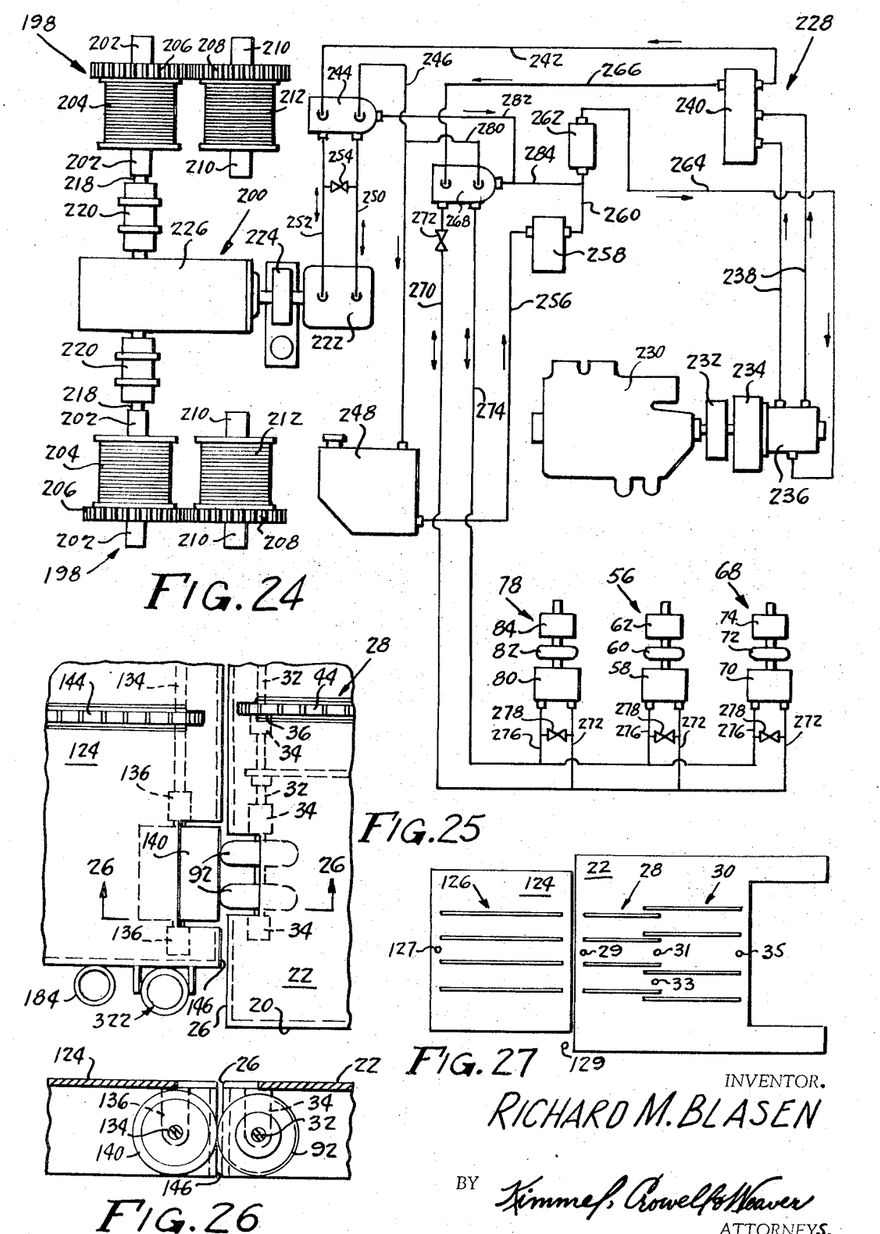
FIGURE 24 is a schematic view of the power delivery system of the instant invention.
FIGURE 25 is a partial top plan view showing the transmission of power between the cargo exchanging surface and the elevator platform to drive the conveyor of the platform.
FIGURE 26 is a cross-sectional view of the power transmission device of FIGURE 25 taken along line 26—26 thereof and viewing in the direction of the arrows.
FIGURE 27 is a schematic view of the conveyor and actuators therefor of the instant invention.

Referring momentarily to FIGURE 27, a schematic view of conveyors 28, 30, 126 is shown in conjunction with a plurality of switches 29, 31, 33, 35, 127 and 129 for actuating and de-actuating the associated conveyors as more fully explained hereinafter. An appropriate electrical or hydraulic control circuit may be provided to set switches 29, 31, 33, 35, 127 and 129 for either the loading or unloading condition.

In the unloading operation, a fork lift operator will set the control circuit to the unloading condition which results in conveyors 28, 30 traversing from left to right as shown in FIGURE 27. Elevator means 14 is initially positioned in the hold of barge 131 or the like, positioned adjacent dock face 133 and separated therefrom by a log bumper 135 or other suitable means as shown in FIGURE 1 and is loaded with a containerized package 137 in any suitable manner. As more fully explained hereinafter, elevator means 14 is raised until cargo supporting surface 124 is aligned with cargo exchanging surface 22, at which time switch 129 actuates drive means 78 and consequently hoist conveyor 126, thus discharging load 137 of the conveyor onto cargo exchanging surface 122. Switch 129 is preferably constructed such that if conveyor 28 is stationary, switch 129 will not operate drive means 78.

As the palletized or containerized load is moved across first conveyor 28, it will come in contact with switch 33 thus turning off drive means 78 and stopping hoist conveyor 126 and automatically lowering elevating means 14 onto barge 131. The load is traversed to the right as shown in FIGURE 27 until the load contacts switch 35 turning off conveyor 30. When an additional load is hoisted from barge 131 and placed on cargo exchanging surface 122, the load will move to the right as shown in FIGURE 27 until it contacts switch 131 which will then stop first conveyor 28.

When a load is removed from a position above second conveyor 30, a time delay is actuated with first and second conveyors 28, 30 being started thereby to position the load from above first conveyor 28 to a position above second conveyor 30.

It should be apparent that this method of unloading is quite rapid without requiring the services of an elevator operator to manipulate the various switches and conveyors. Initial calculations indicate a total unloading cycle time of about 60 seconds, which is composed of 25 seconds to load elevator 14, about 14.5 seconds each to raise and lower elevator 14 and six seconds to unload elevator 14.

In the loading condition, a fork lift operator on dock surface 18 may actuate the control circuit to the loading condition. Elevator means 14 is positioned adjacent cargo receiving surface 22 and conveyors 28, 30 are translated in a right to left direction with switch 129 actuating drive means 78 to translate hoist conveyor 126 in a like direction. A fork lift operator may position a load upon second conveyor 30 which, because of the translatory movement of conveyors 30, 28, 126, will move to a position overlying cargo supporting surface 124. As the load comes into contact with switch 127, drive means 78 will be disconnected thereby halting the movement of conveyor 126 and consequently the palletized load. Switch 127 also automatically actuates the hoisting mechanism of elevator means 14 to position cargo supporting surface 124 in the hold of barge 131. Conveyors 28, 30 continue to run with switch 129 open, and a palletized load placed on conveyor 30 will be translated toward the end of the dock until it actuates switch 29 at which time both first and second conveyors 28, 30 will be stopped. It should be apparent that another palletized load may be positioned above second conveyor 30 without reactuating the translatory scheme of first conveyor 28.

During the time that conveyors 28, 30 are being loaded from dock surface 18, elevator means 14 is being unloaded in the hold of barge 131 by a fork lift or the like, with the operator thereof actuating, by radio signalling equipment or the like, the lift means for elevator 14. As elevator 14 rises, it will become co-planar with cargo exchanging surface 22, at which time switch 129 will turn off the hoist elevating means and actuate first and second conveyors 28, 30 to deliver a load to cargo supporting surface 14. The cargo positioned on elevator 14 will actuate switch 127 thus turning off conveyor 126 and lowering elevator means 14. The second palletized load will strike switch 129 and will de-actuate both first and second conveyors 28, 30.

Referring now to FIGURE 24, a main hoist drive is indicated generally at 228 for actuating drive means 200 and consequently wheels 204, 212. Hoist drive 228 may either be of the electric or hydraulic variety, with the hydraulic variety being illustrated. Hoist drive 228 includes a suitable prime mover 230 which may be of any desired type, but which is preferably an internal combustion engine, positioned as in either the solid or dotted line position shown in FIGURE 1 and connected by a vibration dampener 232 and a torque convertor 234 to a high pressure high volume hydraulic pump 236. A series of suitable high pressure hydraulic lines 238 connect the discharge of pump 236 to a manifold 240 which is connected by a first hydraulic line 242 to a four-way, three-position, solenoid operated valve 244. A second hydraulic line 246 connects solenoid valve 244 to a reservoir 248. A pair of hydraulic conduits 250, 252 connect motor 222 of hoist means 200 to solenoid valve 244. A cross-over relief valve 254 connects lines 250, 252 to preclude the dangerous build-up of pressure on the high pressure side of motor 222.

It should be apparent that pressurized fluid leaving pump 236 travels through manifold 240, hydraulic line 242, solenoid valve 244 and hydraulic conduit 252 to actuate motor 222 to raise elevator means 14 from barge 131 to adjacent dock surface 18. Exhaust fluid leaving motor 222 travels through hydraulic conduit 250, solenoid operated valve 244, and second hydraulic line 246 to reservoir 248.

When it is desired to lower elevator means 14, it is necessary to manipulate valve 244 which may be done by switches 127, 129 and by a radio signalling device such that fluid from first hydraulic line 242 passes through hydraulic conduit 250 and returns through conduit 252 and second hydraulic line 246 into reservoir 248.

The hydraulic supply circuit delivering low pressure fluid to hydraulic pump 236 includes reservoir 248, a hydraulic line 256 connecting reservoir 248 to a filter 258 which in turn is connected by a conduit 260 to a cooler 262 for lowering the temperature of the fluid in a conventional manner. Cooler 262 is connected to the inlet of pump 236 by a suitable hydraulic conduit 264.

Manifold 240 includes a third hydraulic line 266 communicating from the high pressure side thereof to a four-way, three position, hand operated or solenoid operated valve 268 which controls the operation of conveyors 28, 30, 126. Valve 268 is connected with drive means 56, 68, 78, by a hydraulic conduit 270 in which resides a flow control valve 272 of any suitable type. Hydraulic line 270 is connected by a series of branch circuits 272 to one side of hydraulic motors 58, 70, 80 for driving conveyors 28, 30, 126 in a first direction.

Another hydraulic line 274 connects valve 268 to the other side of motors 58, 70, 80 by a series of branch lines 276. A cross-over relief valve 278 of any suitable type is positioned between branch circuits 272, 276 leading to each of motors 58, 70, 80 to preclude the build up of destructive pressures. A discharge line 280 leads from one port of valve 278 and connects with second hydraulic line 246 to deliver low pressure fluid to reservoir 248. It should be apparent that the positioning of valve 268 in an appropriate position, such as must be done when changing from the loading to the unloading cycles, will deliver high pressure fluid from manifold 240 to either of hydraulic lines 270, 274 to provide for the reversible driving of conveyors 28, 30, 126.

To provide for additional flexibility of hoist drive 228, an additional low pressure discharge line 282, 284 is provided for each of valves 244, 268 to deliver low pressure fluid into conduit 260 between filter 258 and cooler 262. It should be apparent that the actuation of valves 244, 268 will by-pass reservoir 248 and deliver low pressure fluid into the inlet side of pump 236.

When the fork lift operator desires to set cargo handling device 10 for loading or unloading, he will position valve 268 appropriately to drive motors 58, 70, 80 to create the desired direction of movement for conveyors 28, 30, 126. Since fluid is continually being delivered to motors 58, 70, 80, they will provide a driving force at all times. Switch means 29, 31, 33, 35, 127 and 129 are appropriately connected to clutch means 60, 72, 82 to selectively actuate and de-actuate conveyors 28, 30, 126.

Referring now to FIGURES 8 to 12 inclusive, there is shown an alternative form of elevator means indicated generally at 286 including a cargo supporting surface 288 having an initial wall 290, a terminal wall 292 and lateral walls 294. Affixed to lateral walls 294 are a series of standing tubular supports 296 through which cables may be placed to connect elevator means 286 to a sheave carriage as shown in FIGURE 5. A series of suitable braces 298 are secured to laterally spaced tubular supports 296 and serve to rigidify the same.

Adjacent initial and terminal edges 290, 292 are located a plurality of spaced openings 300 for the reception of a bar rail 302 to preclude the possibility of a fork lift or the like 304 from inadvertently rolling off cargo supporting surface 288. As shown in FIGURE 11, a pair of lifting arms 306 of fork lift 304 are secured beneath guard rail 302 and may be elevated to remove rail 302 from apertures 300. In a similar manner, a guard rail 308 may be provided in elevator means 14 by apertures 310 for similar purposes.

Removably attached to elevator means 286 is a dock board shown generally at 312 allowing for the delivery of a fork lift into the hold of barge 131 comprising a planar load supporting surface 314 and a pair of laterally spaced flanges 316. Dock board 312 is removably attached to elevator means 286 by a pair of cooperating slots 318 in cargo supporting surface 288 and a pair of tongues 320 residing therein. From the configuration shown in FIGURE 9, it will be seen that dock board 312 will not inadvertently be pivoted out of slots 318.

Mounted on each of lateral edges 294 of elevator means 286 is a pair of spaced apart snubbers or shock absorbers indicated generally at 322. Snubber 322 includes an outer tubular body 324 secured to lateral edges 294 by a pair of laterally extending plates 326 as seen in FIGURE 10 with the upper end of tube 324 being closed by a cap 328 to preclude the entry of abrasive material or the like. Secured adjacent the upper end of tubular body 324 is a transversely extending member 330 to which is pivotally secured a clevis shaped connection 332 of a load stop or shock absorber device shown generally at 334. Load stop 334 includes an outer tubular body 336 in which is mounted a reciprocable piston 338 connected with a piston rod 340 connected by a clevis 342 to a ground engaging support shown generally at 344.

Ground engaging support 344 includes a resilient rubber molding 346 which is secured to clevis 342 by a cylindrical threaded connecting member 348. Surrounding connecting member 348 and threadably engaged thereto is an inner tubular body 350 extending coaxially within outer tubular body 324 and provided with a plurality of spacers 352 therebetween. Surrounding rubber molding 346 is a metal protective ring 354 as shown in FIGURE 14. Snubber 322 is mounted on elevator means 286 such that both ground engaging support 344 and a portion of inner tubular member 350 extend below lateral edges 294.

When each of ground engaging supports 344 contacts the surface of a barge 131, snubber 322 acts as a shock absorber to lessen the impact transmitted to a palletized or containerized load. It should be apparent that snubbers 322 are equally adapted to be used on elevator means 14.

Figure 17:
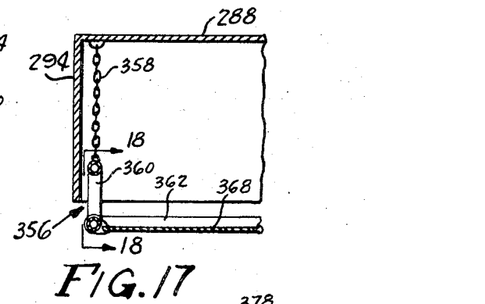
FIGURE 17 is a cross-sectional view of FIGURE 16 taken along line 17—17 thereof and viewing in the direction of the arrows.
Figure 18:
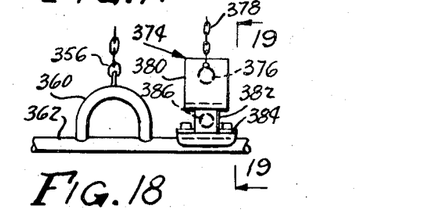
FIGURE 18 is a cross-sectional view of FIGURE 17 showing another view of the safety cut-off frame.
Figure 19:
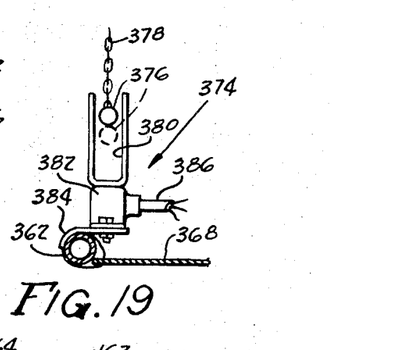
FIGURE 19 is a cross-sectional view of the safety cut-off frame of FIGURE 18 taken along line 19—19 thereof and viewing in the direction of the arrows.

An important safety feature in the instant invention, which is shown in FIGURES 17-19, resides in the use of a safety cut-off frame indicated generally at 356 positioned beneath cargo supporting surface 288 by a series of cables 358 attached to an arch-shaped connecting portion 360 which is in turn attached to a peripheral frame 362 of safety cut-off 356. Connecting opposite sides of peripheral frame 362 together are a series of perpendicular braces 364, 366 which form a plurality of square shaped openings which are closed by a series of square canvas panels 368 having centrally disposed apertures 370 therein for the drainage of water.

Canvas panels 368 may be secured to peripheral frame 362 and perpendicular braces 364, 366 in any suitable manner, such as by stitching or gluing and may be made more secure by a plurality of lashes 372. Positioned on peripheral frame 362 adjacent each corner thereof is a magnetically operated switch shown generally at 374 including a magnet 376 suspended by a chain 378 attached to cargo supporting surface 288 and residing in a U-shaped aluminum or other non-magnetizable member 380 which is in turn secured to the operating magnetic switch 382 secured to peripheral frame 362 by a bracket 384. Operating switch 382 is connected by an electrical wire 386 to load break 224 and solenoid valve 244 for purposes more fully explained hereinafter.

If, during the lowering of elevator means 286, safety cut-off 356 should come in contact with an unexpected body, peripheral frame 362 will be lifted thus juxtaposing magnet 376 with operating switch 382 to actuate load break 224 and solenoid valve 244 to immediately cease the lowering of platform 286. It should be apparent that safety cut-off 356 is equally applicable to elevator means 14.

Figure 20:
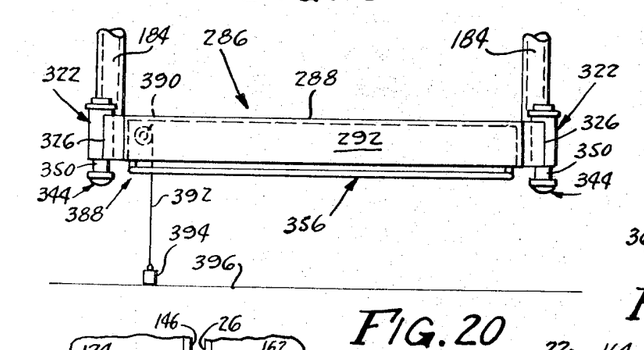
FIGURE 20 is a side elevational view of another form of elevator means showing a slow speed and time delay control device.

Another important safety feature of elevator means 286 is a slow speed and time delay control device shown generally at 388 including a spring return, two circuit, cam type, slow speed, quick break type heavy duty, rotary limit switch 390 secured beneath cargo supporting surface 288. A cable 392 having a weight 394 positioned on the end thereof is wound about limit switch 390 to contact an underlying surface 396 when elevator means 286 approaches surface 396. When weight 394 contacts surface 396, rotary switch 390 begins to wind up cable 392.

The wind up of cable 392 results in the completion of an electrical circuit which slows the descent of elevator means 286 and which starts the operation of a time delay device (not shown). After a predetermined time has lapsed, about two seconds, the time delay device stops the hoist motor 222 by manipulation of solenoid valve 244. It will be seen that time delay device 388 may be used with equal appropriateness in elevator 14.

When a load is positioned on elevator means 286, as may be done by a fork lift truck and operator, the operator actuates a radio transmitter which operates through conventional circuitry to manipulate solenoid valve 244 to begin the gradual ascent of elevator means 286. Upon initial ascent of elevator means 286, weight 394 begins to unwind the rotary switch 390 which puts drive means 200 into high speed thus facilitating the rapid ascent of elevator means 286.

It is now seen that there is herein provided an improved cargo handling device having all the objects of this invention and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in a limiting sense.

I claim:

1. A cargo handling device for loading and unloading rigid lower wall articles from a vessel moored adjacent a dock, which comprises:
 a frame, which includes
  a cargo support frame portion,
  an elevator support frame portion which includes
   an elevator support extension disposed above and extending beyond the edge of the cargo support frame portion, and
   an upright support assembly for supporting the elevator support frame portion above the cargo support portion to form a generally centrally located cargo receiving area, an entry and exit opening for permitting a lift truck to deposit cargo articles in said receiving area beneath said elevator support frame portion, and a second entry and exit opening intermediate the cargo support frame portion and the elevator support extension to permit said cargo articles to be removed from the cargo receiving area or received thereinto from beneath said elevator support frame;
 means mounting the frame for mobility on said dock;
 an elevator including means suspending a cargo supporting portion from the elevator support extension for moving said cargo supporting portion from a position adjacent the cargo receiving area to a position substantially below the dock in the hold of the vessel to permit loading and unloading of the vessel from said cargo supporting portion;
 a conveyor in said cargo receiving area on said cargo support frame portion; and
 a conveyor on said elevator cargo supporting portion, said conveyors being disposed and arranged to cooperatively move cargo articles from said cargo receiving area to said cargo supporting portion and from said elevator to said cargo receiving portion.

2. The structure of claim 1 wherein said elevator conveyor includes at least one frictional driven wheel connected in driving relation to said conveyor juxtaposed to said frame when said elevator is in said second position, means mounted on said frame including at least one frictional drive means in driving relation with said frictional drive wheel when said elevator is in said second position for driving said frictional drive wheel and said elevator conveyor.

3. The structure of claim 1 including a first pair of wheel assemblies mounted on said frame for rotation about a horizontal axis and a second pair of wheel assemblies, each of said second wheel assemblies mounted on a stub axle for rotation about a horizontal axis and means mounting said stub axles on said frame for rotation about a vertical axis, whereby the cargo handling device may be secured against inadvertent movement.

4. The structure of claim 3 wherein said first pair of wheel assemblies are mounted between said second pair of wheel assemblies and said elevator means, at least one auxiliary vertically reciprocable load supporting means mounted on each lateral side of said frame between said first wheel assemblies and said elevator means for selectively engaging an underlying supporting surface.

5. The structure of claim 1 including means on said elevator and frame for aligning said cargo supporting portion of said elevator and said cargo receiving area of said frame.

6. The structure of claim 5 wherein said aligning means includes a shank having a roller rotatably mounted on one end thereof and a slot forming means for receiving said roller.

7. The structure of claim 6 wherein switch means are provided on said frame associated with said aligning means for stopping the upward movement of said elevator means when said cargo supporting surface of said elevator is aligned with said cargo exchanging surface of said frame.

8. The structure of claim 1 including said conveyor in said cargo receiving area having at least one endless member mounted for rotation on said frame adjacent said terminal edge in cargo exchanging relation with said elevator, means for reversibly driving said endless member, and switch means actuable by a load carried on said endless member for actuating and deactuating said reversible driving means.

9. The structure of claim 8 including said conveyor on said elevator having at least one endless member mounted for rotation on said elevator for moving cargo toward and away from said frame, means for reversibly driving said endless member and switch means on said cargo supporting surface actuable by a load carried on said endless member of said elevator conveyor for deactuating said elevator conveyor.

10. The structure of claim 9 including a second conveyor having at least one endless member mounted for rotation on said frame in cargo exchanging relation with said conveyor in said cargo receiving area, means for reversibly driving said endless member and switch means actuable by a load carried on said endless member of said second conveyor for actuating and deactuating said second conveyor.

11. The structure of claim 1 wherein said means raising and lowering said elevator includes control means actuable from a remote location for raising said elevator from said first position.

12. The structure of claim 1 wherein said elevator includes a sheave carriage, a plurality of flexible members connecting said sheave carriage and said load supporting surface and an inflexible conduit for each of said flexible members, said conduit being secured to said load supporting surface in substantial coaxial alignment with said flexible members to protect said flexible members from impact with a load carried on said load supporting surface.

References Cited

UNITED STATES PATENTS

| | | | |
|---|---|---|---|
| 2,521,727 | 9/1950 | Kappen | 214—518 |
| 2,536,080 | 1/1951 | Patton | 214—75 |
| 2,635,771 | 4/1953 | Black | 214—75 |
| 2,939,569 | 6/1960 | Roach et al. | 198—37 |
| 2,949,197 | 8/1960 | Lomen et al. | 214—75 |
| 3,075,659 | 1/1963 | Sylvester et al. | 214—38 |
| 3,243,060 | 3/1966 | Pietroroia | 214—75 |

GERALD M. FORLENZA, *Primary Examiner.*

ROBERT G. SHERIDAN, *Examiner.*